US011657407B1

(12) United States Patent
Bradley et al.

(10) Patent No.: US 11,657,407 B1
(45) Date of Patent: May 23, 2023

(54) FILTERING DATA WITH PROBABILISTIC FILTERS FOR CONTENT SELECTION

(71) Applicant: Amazon Technologies, Inc., Seattle, WA (US)

(72) Inventors: Andrew J. Bradley, Edinburgh (GB); Andrew Douglas Birkett, Edinburgh (GB); Anirudh Dastidar, West Midlands (GB); Fred Grossman, Nordrhein Westfalen (DE); Anthony Richard McBryan, West Lothian (GB); Sebastiano Merlino, Edinburgh (GB)

(73) Assignee: Amazon Technologies, Inc., Seattle, WA (US)

(*) Notice: Subject to any disclaimer, the term of this patent is extended or adjusted under 35 U.S.C. 154(b) by 981 days.

(21) Appl. No.: 15/457,481

(22) Filed: Mar. 13, 2017

(51) Int. Cl.
*G06Q 10/00* (2023.01)
*G06Q 30/0201* (2023.01)
*G06N 7/01* (2023.01)

(52) U.S. Cl.
CPC .......... *G06Q 30/0201* (2013.01); *G06N 7/01* (2023.01)

(58) Field of Classification Search
CPC combination set(s) only.
See application file for complete search history.

(56) References Cited

U.S. PATENT DOCUMENTS

| 7,792,706 | B2* | 9/2010 | Tirumalareddy | G06Q 30/0643 |
| | | | | 705/26.7 |
| 7,991,757 | B2* | 8/2011 | Kane, Jr. | G06F 16/9535 |
| | | | | 707/706 |
| 8,010,407 | B1* | 8/2011 | Santoro | G06Q 30/0251 |
| | | | | 705/14.49 |
| 8,019,642 | B2* | 9/2011 | Selinger | G06Q 30/0251 |
| | | | | 705/26.7 |

(Continued)

OTHER PUBLICATIONS

Importance-aware bloom filter for managing set membership queries on streaming data R Bhoraskar, V Gabale, P Kulkarni, D Kulkarni 2013 Fifth International Conference on Communication Systems and Networks , (Year: 2013).*

(Continued)

*Primary Examiner* — Rutao Wu
*Assistant Examiner* — Scott M Ross
(74) *Attorney, Agent, or Firm* — Eversheds Sutherland (US) LLP

(57) ABSTRACT

Systems, methods, and computer-readable media are disclosed for filtering data with probabilistic filters for content selection. In one embodiment, an example method may include determining a user interaction history with a first product identifier for a user account, determining a first parent product identifier of the first product identifier, and generating a database with the first parent product identifier and a user account identifier for the user account. Example methods may include determining a set of candidate content with first content and second content for the user account, (Continued)

determining a second product identifier associated with the first content, and determining a second parent product identifier of the second product identifier. Example methods may include determining that the second parent product identifier is not present in the database using a probabilistic filter, and determining that the first content is eligible for presentation.

20 Claims, 7 Drawing Sheets

(56) References Cited

U.S. PATENT DOCUMENTS

| | | | | |
|---|---|---|---|---|
| 8,229,861 | B1* | 7/2012 | Trandal | G06Q 30/012 |
| | | | | 705/26.1 |
| 8,924,429 | B1* | 12/2014 | Fisher | G06F 16/285 |
| | | | | 707/802 |
| 9,256,903 | B2* | 2/2016 | Emura | G06Q 30/08 |
| 9,407,975 | B2 | 8/2016 | Grusd | |
| 9,672,554 | B2 | 6/2017 | Dumon et al. | |
| 10,318,993 | B2* | 6/2019 | Baghaie | G06Q 30/0261 |
| 10,460,348 | B1 | 10/2019 | Peddinti et al. | |
| 10,825,064 | B1* | 11/2020 | Bradley | G06Q 30/0282 |
| 2001/0054008 | A1 | 12/2001 | Miller et al. | |
| 2002/0161673 | A1 | 10/2002 | Lee et al. | |
| 2005/0004880 | A1* | 1/2005 | Musgrove | G06Q 30/0253 |
| | | | | 705/400 |
| 2005/0033803 | A1* | 2/2005 | Vleet | G06Q 30/02 |
| | | | | 707/E17.116 |
| 2005/0289039 | A1 | 12/2005 | Greak | |
| 2007/0078827 | A1* | 4/2007 | Sareen | G06F 16/3346 |
| 2008/0103876 | A1* | 5/2008 | Armstrong | G06Q 30/0202 |
| | | | | 705/7.31 |
| 2008/0154765 | A1* | 6/2008 | Wolfe | G06Q 30/0239 |
| | | | | 705/37 |
| 2008/0195475 | A1 | 8/2008 | Lambert et al. | |
| 2008/0215349 | A1* | 9/2008 | Baran | G06Q 10/10 |
| | | | | 705/1.1 |
| 2009/0030786 | A1* | 1/2009 | Rosler | G06Q 30/0211 |
| | | | | 705/14.13 |
| 2011/0251875 | A1 | 10/2011 | Cosman | |
| 2011/0264551 | A1 | 10/2011 | Lau | |
| 2012/0036023 | A1 | 2/2012 | Das et al. | |
| 2012/0246003 | A1* | 9/2012 | Hart | G06Q 30/0261 |
| | | | | 705/14.57 |
| 2013/0325636 | A1 | 12/2013 | Carter et al. | |
| 2014/0258032 | A1 | 9/2014 | Psota et al. | |
| 2014/0358666 | A1* | 12/2014 | Baghaie | G06Q 30/0261 |
| | | | | 705/14.58 |
| 2015/0206109 | A1* | 7/2015 | Caldwell | G06Q 30/0255 |
| | | | | 705/39 |
| 2016/0371729 | A1* | 12/2016 | Glover | G06Q 30/0248 |
| 2017/0017971 | A1* | 1/2017 | Moreau | G06Q 30/0202 |
| 2017/0323380 | A1 | 11/2017 | Alberti et al. | |
| 2019/0332701 | A1* | 10/2019 | Rutherglen | G06F 16/245 |
| 2020/0027120 | A1* | 1/2020 | Segalov | G06Q 30/0271 |
| 2020/0342066 | A1 | 10/2020 | Lewis | |
| 2021/0319127 | A1* | 10/2021 | Lin | G06F 21/44 |
| 2022/0245175 | A1* | 8/2022 | Hawco | G06N 20/20 |

OTHER PUBLICATIONS

Pepsi Cola-Soda Radio 1998, Ebay (Year: 2019).*
Pepsi is Launching Android Phone , The Verge (Year: 2015).*
Pepsi Instant Camera, Ebay (Year: 2019).*
"Creating a Bloom Filter with Go" See Dylan Meeus, Nov. 23, 2019; https://medium.com/@meeusdylan/creating-a-bloom-filter-with-go-7d4e8d944cfa (Year: 2019).*
"Bloom filter: The efficient and compact way of storing Big Data" Gaurav Aggarwal, Jan. 12, 2015 https://www.linkedin.com/pulse/bloom-filter-efficient-compact-way-storing-big-data-gaurav-aggarwal (Year: 2015).*
Colleen Connolly-Ahem, Accounts, Media, and Culture: An International Impression Management Experiment (Year 2004); 20 pages.
Hella Kaffel—Ben Ayed et al. "Fairness and Access Control for Mobile P2P Auctions over MANETs" Journal of Theoretical and Applied Electronic Commerce Research, vol. 7, Issue 3; Dec. 2012; 16 pages.
W. Chen "Caching Dynamic Content on the Web" Queen's University, Kingston, Ontario; Jun. 2003; 115 pages.

* cited by examiner

FILTERING DATA WITH PROBABILISTIC FILTERS FOR CONTENT SELECTION

BACKGROUND

Content may be presented on electronic devices to users such that users can consume the content. Users may consume or interact with certain content while other content may not be consumed or interacted with. A user's intent in viewing content may be indicative of whether the user is interested in the content or a related product or service. However, after a user has made a decision or has otherwise decided that the user is or is not interested in certain content, an effectiveness of presenting certain content to the user may be decreased. For example, if a user has subscribed to a magazine, asking the user to subscribe to the magazine in the future may be ineffective. On the other hand, if the user is not interested in the magazine after becoming aware of the magazine, effectiveness of presenting content may also be decreased. Accordingly, effectiveness of content may be increased by selection of relevant content.

Figure 1:
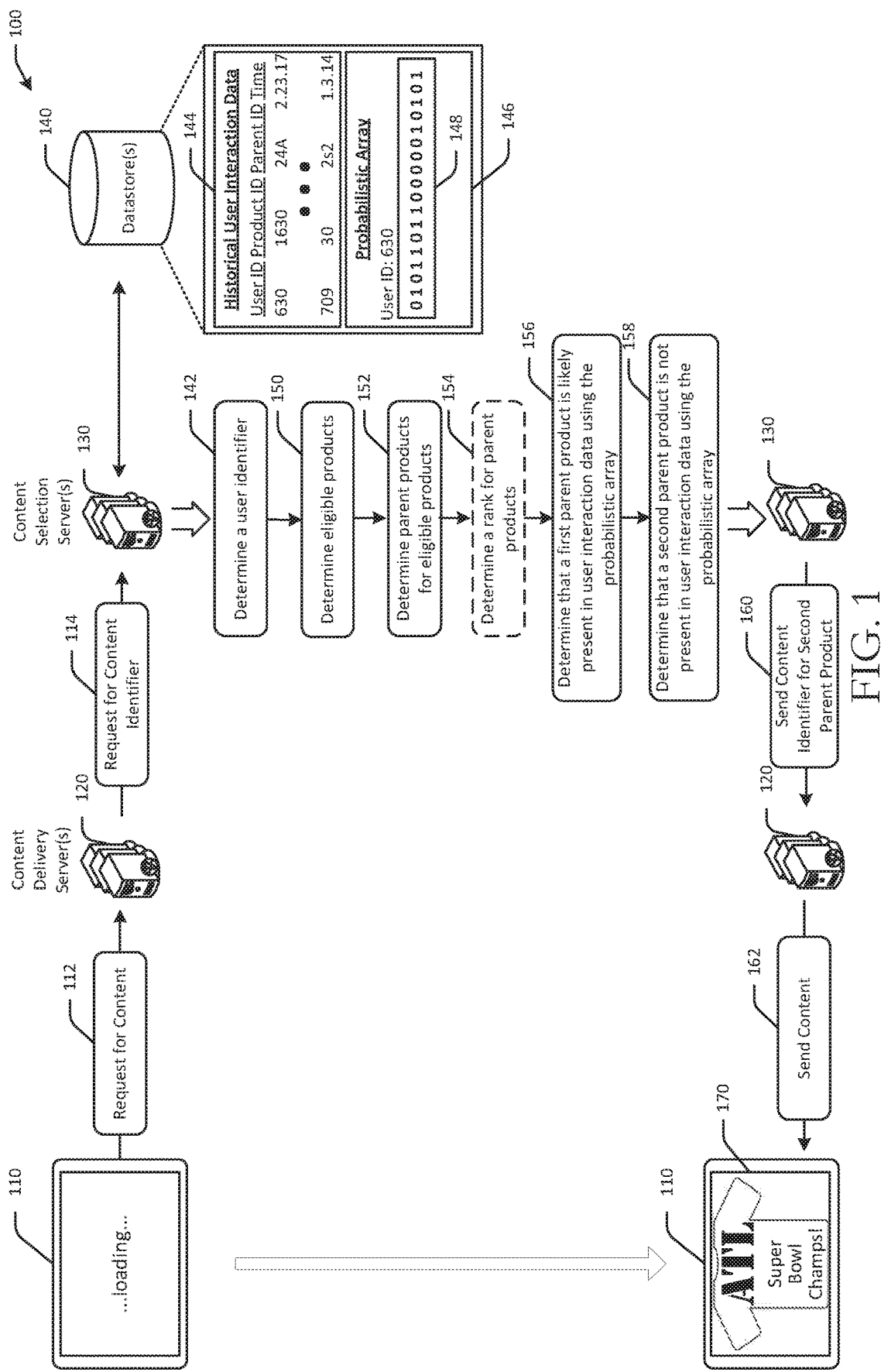
FIG. 1 is a hybrid system and process diagram illustrating filtering data with probabilistic filters for content selection in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume the digital content. Content for delivery may include content such as text, images, videos, audio, and other content. Some content may include images of particular products, as well as additional product related information. Content may be targeted to specific users or groups of users. For example, targeting criteria for content that includes a product such as a smartphone may indicate that the content is to be presented to users in geographic locations where the smartphone may be available for purchase, as well as users that meet certain demographic, income, age or age range, and/or user preference criteria. Other targeting criteria may be used.

In some instances, a user may browse, in a digital environment, one or more products. For example, a user may look at a particular product while contemplating a purchase of the product. Certain user interactions with the product or with information associated with the product may indicate a level of interest and/or a user intent regarding the product. For example, if a user navigates to product reviews of the product, the user may be interested in purchasing the product. If the user spends several minutes at the product reviews, that may be an indication that the user read one or more of the product reviews and that the user is interested in purchasing the product. In another example, if the user adds the product to a digital shopping cart, or if the user searches for discount codes for the product, such user interactions may reflect a level of interest in the product. Therefore, presenting content to the user that is related to the product may result in the user making a purchase of the product. Some content may have or be associated with targeting criteria that includes users that have previously viewed or otherwise interacted with a product webpage, a product information page, or other product related data.

However, after purchasing the product, the user may no longer be interested in purchasing the product again, because the user has already purchased it. Accordingly, presenting content to the user that is related to the product may be ineffective and an otherwise poor use of resources, as the user is unlikely to purchase the product again. In some instances, such as if the product is a consumable product, then user may be interested in purchasing the product again, and so presenting content to the user that is related to the product may be effective after a period of time has elapsed.

Embodiments of the disclosure may prevent presentation of content to users that have recently bought an item that is featured in, or otherwise related to, particular content, so as to increase an effectiveness of content that is presented to users, thereby increasing user engagement and/or interaction with content. Certain embodiments may select content or product identifiers from amongst tens of millions of pieces of content or product identifiers, and may have a limited amount of time to select content for presentation. Such embodiments may determine whether a user is eligible for certain content, and may use probabilistic filters to determine whether the content or a related product identifier is present in the user's purchase or interaction history. In some instances, parent product identifiers, which may be broader product categories of a specific product (e.g., smartphones with 5.5" screens may be a parent product category of an iPhone, etc.), may be determined for products that a user has purchased. The purchased products and/or the respective parent product identifiers may be stored in a database, such as a probabilistic array. At a time when content is to be selected for presentation to the user, a parent product identifier of a potential product for which content is to be presented may be determined. A query of the probabilistic database may be made so as to determine whether the parent product identifier of the potential product to be presented to the user is present in the database. A response to the query may indicate that the parent product identifier is definitely not in the database, or that there is a chance the parent product identifier may be in the database. Based at least in part on the response to the query, certain content and/or product identifiers can be determined or selected for presentation to the user. Some embodiments may definitively determine whether the parent product is in the database. By using the probabilistic filters and databases described herein, a determination and/or selection of content or product identifiers can be made within a relatively short timeframe (e.g., within about 50 milliseconds), regardless of the size or number of potential products or content from which the selection is to be made. Some embodiments may use the probabilistic filter, as well as another query for the product itself, rather than (or in addition to) the parent product identifier.

In some embodiments, users may be grouped or linked together, and content or product identifiers that are prevented from being presented to one of the users in a group may be extended across one or more, or all, of the users in the group. For example, if one user in a household purchases a television, then content related to televisions may be prevented from presentation to another user in the household, as it may be unlikely that the other user will purchase another television. Accordingly, content selection may be improved, and selected content may have increased relevance to users.

This disclosure relates to, among other things, systems, methods, computer-readable media, techniques, and methodologies for filtering data with probabilistic filters for content selection. Embodiments may generate a database representing purchase events for particular users, and may use the database to determine whether a potential product identifier or parent product identifier is present in the database. If the potential product identifier or parent product identifier is not present in the database, the potential product identifier or parent product identifier may be selected for presentation. If the potential product identifier or parent product identifier is definitely or is possibly in the database, the potential product identifier or parent product identifier may not be selected for, or may be prevented from, selection for presentation. In some instances, a fallback or default image or content may be presented instead of a selected product identifier.

Referring to FIG. 1, an example use case 100 illustrating filtering data with probabilistic filters for content selection is depicted in accordance with one or more embodiments of the disclosure. A user may be using a device 110 to access digital content. For example, the user may use the device 110 to access news, videos, images, articles, or other digital content. The device 110 may request content from one or more content delivery servers 120 over one or more wired or wireless networks. For example, the device 110 may be a smartphone and may request digital content from the content delivery server 120 over a WiFi or cellular network. Specifically, the device 110 may send a request for content at a first communication 112. The content delivery server 120 may receive the request for content from the device 110. The content that is requested by the device 110 may have one or more content delivery slots, or portions of the content at which a third party (e.g., in some instances a party other than a content publisher, etc.) may present content in addition to the requested content. For example, a video may be presented before or after presentation of the requested content, an image or certain content may be presented in line with the requested content, and the like.

At a second communication 114, the content delivery server 120 may request content and/or a content identifier from one or more content selection servers 130. The content selection server 130 may be one of a number of, or multiple, servers that receive the request for the content identifier from the content delivery server 120. The request for the content identifier from the content delivery server 120 may include a request for the content that was requested by the user device and/or a request for third-party or additional content. The second communication 114 may be a bid request, or a request for connected entities to bid on the opportunity to present content at a particular content delivery slot. The second communication 114 may include contextual information, such as a website of the content that was requested by the device 110, time and date information, etc., user information, such as a user identifier for the user that is operating or otherwise associated with the device, location information for the content delivery slot (e.g., for videos or audio content, a location could represent a playback position, such as before or after the requested content, etc.), and other information. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. The second communication 114 may also include user attributes for the user, geographic location information, time of day, contextual information for the content around the available content delivery slot, and other contextual information.

The content selection server 130 may be in communication with one or more datastores 140. The datastore 140 may include historical user interaction data 144, one or more probabilistic arrays 146, and other data. The historical user interaction data 144 may include user interaction data for one or more users over a period of time. For example, the historical user interaction data 144 may include clickstream data for one or more users. Clickstream data may include data related to user browse interactions, such as clicks, views, timings, and other information. The historical user interaction data 144 may include information related to user interactions such as purchases, clicks, views, hovers, likes, shares, comments, and other user interactions. For example, as illustrated in FIG. 1, the historical user interaction data 144 may include product identifier information for products that a particular user has interacted with. The product identifier information may be linked to or otherwise associated with a user identifier or a user profile of the user.

For one or more, or for each, of the products that the user has interacted with, a parent product identifier may be determined. The parent product identifier may be a broader product, such as a particular Nike shoe model (e.g., with the product identifier being the particular Nike shoe model of a particular size, etc.), a product category (e.g., Nike shoes, shoes, etc.), a product type, or another parent product identifier. The parent product identifier may be linked to a number of child product identifiers, which may be particular versions, sub-products, competing products, or other product identifiers. In one example, a parent product identifier may be determined by identifying and/or analyzing a browse node or other hierarchy of products. A browse node may represent product families, such as parent products, children products, sibling products, etc. In some embodiments, a browse node may be represented as a set of webpages associated with a brand, product/service, or type of product/service, etc.

A parent product identifier may be determined for one or more of the product identifiers that a user has interacted with. Additional information, such as time of interaction, an elapsed time since interaction, etc. may be included in the historical user interaction data 144. The historical user interaction data 144 may include information for one or more, or all, users.

The probabilistic array 146 may include an array representing the historical user interaction data 144 for a particular user. For example, the probabilistic array 146 may represent user interactions for a user having the user identifier "630." In some instances, the probabilistic array 146 may represent specific user interactions, such as purchases of products. The probabilistic array 146 may be generated using one or more probabilistic algorithms or filters, such as a bloom filter. The probabilistic array 146 may include one or more alphanumeric values that are modified based at least in part on the user interactions a particular user engages in. For example, a particular user interaction or a particular product identifier and/or parent product identifier may be mapped to certain positions 148 in the probabilistic array 146. As the user engages in certain interactions, the values of characters in certain positions 148 in the probabilistic array 146 may be modified, so as to represent the user interaction. In the illustrated example, the sequence of "0 1 0" at the left side of the probabilistic array 146 may represent a user purchase of a product in the 80" television parent product category. The probabilistic array 146 may be queried or tested to determine whether a particular element is present, or can be found, in the probabilistic array 146. In one example, the probabilistic array 146 may be queried to determine whether a user has purchased a particular product or a product in a particular category of products. False positive matches may be possible (e.g., a query results in a positive response when the parent product category is actually not present in the probabilistic array, etc.), while false negatives may not be possible. Other probabilistic filters may be used. The probabilistic array 146 may reduce an amount of memory needed to store and/or access the historical user interaction data 144.

After receiving the second communication 114, one or more computer processors at the content selection server 130 may execute certain operations. For example, at a first operation 142, the content selection server 130 may determine a user identifier. The content selection server 130 may determine the user identifier by extracting the user identifier from the request received from the content delivery server 120 at the second communication.

At a second operation 150, the content selection server 130 may determine eligible products. The content selection server 130 may determine one or more eligible product identifiers, or in some instances content identifiers, that are eligible for presentation to the user identifier. In some instances, eligibility of product identifiers or content identifiers may be determined based at least in part on targeting criteria associated with the respective product identifiers or content identifiers. In other instances, eligibility of product identifiers or content identifiers may be determined based at least in part on the user's historical interactions. For example, if a user has interacted with a product identifier in the past, such as read product reviews associated with the product identifier, the user may be eligible for presentation of content associated with that product identifier, as long as the user has not already made a purchase of the product identifier. In some instances, purchase of a competing product may cause the user to be ineligible for certain product identifiers.

At a third operation 152, the content selection server 130 may determine one or more parent product identifiers for one or more of the eligible products. For example, an eligible product may be a pair of wireless headphones from a particular brand, whereas the parent product identifier may be wireless headphones. Parent product identifiers may be determined for one or more, or all, of the eligible product identifiers.

At an optional fourth operation 154, a rank of the parent products may be determined. The content selection server 130 may rank the parent product identifiers based at least in part on a number of factors. For example, parent product identifiers may be determined based at least in part on the number of times the user interacted with a product that is a child of the parent product identifier. Other factors may include an expected cost of presenting content related to a particular parent product identifier, an expected revenue for presenting content related to a particular parent product identifier, a probability that the user will interact with content that includes or is related to the parent product identifier, and other factors.

In some embodiments, rankings of eligible product identifiers or parent product identifiers may be based at least in part on a ranking score, such as a probability of conversion or a probability of action for specific users. Probability of conversion or probability of action may be the probability that serving one impression to the user will lead to a conversion or a click or other desired action. Probabilities may be determined, for example, by logistic regressions, redundancy models, or other models. The models used to determine probability may consider several inputs, including user-specific information (e.g., demographic, purchase history, etc.), context information (e.g., time of day, website content, keywords, etc.), etc. In some embodiments, the content selection server 130 may pre-rank eligible product and/or parent product identifiers for users, so as to reduce computations at runtime.

At a fifth operation 156, the content selection server 130 may determine that a first parent product is likely present in the user interaction data using the probabilistic array. For example, the content selection server 130 may request, from the datastore 140, the probabilistic array 146 that is associated with or otherwise linked to the particular user for which content or a product identifier is being selected. In some embodiments, the content selection server 130 may query the datastore 140 and/or query the probabilistic array 146 for one or more keys. The content selection server 130 may query the probabilistic array 146 to determine whether the user has purchased a particular product, or whether the user has purchased a product related to a certain parent product identifier. Queries or requests may be made via hash functions or any other suitable method. The one or more keys may correspond to one or more of the parent product identifiers of the eligible product identifiers. For example, the content selection server 130 may query the probabilistic array 146 as to whether the probabilistic array 146 indicates that the parent product identifier of "wireless headphones" is present in the probabilistic array 146 (which may indicate that the user has purchased a product related to the wireless headphones parent product identifier).

The response to a request or a query may indicate that the key, which in this example is the "wireless headphones" parent product identifier, either might be in the probabilistic array 146 (e.g., greater than 0% chance it is present, etc.), or that the parent product identifier is definitely not in the probabilistic array (e.g., 0% chance it is present). The content selection server 130 may query the probabilistic array 146 for all of the parent product identifiers of eligible products, or for certain parent product identifiers, such as for the top five parent product identifiers, etc. if the parent product identifiers are ranked. In the example of FIG. 1, the content selection server 130 may determine that the parent product identifier of "wireless headphones" is likely present, or that it has a greater than 0% probability, in the user interaction data for the user by using the probabilistic array 146.

At a sixth operation 158, the content selection server 130 may determine that a second parent product identifier is not present in the user interaction data using the probabilistic array. For example, the second ranked parent product identifier for the user may be "sports jerseys." The content selection server 130 may query the probabilistic array 146 and determine that the parent product identifier of "sports jerseys" is not present in the probabilistic array 146. This may indicate that the user has not made any purchases of products related to the "sports jerseys" parent product identifier. Because the "sports jerseys" parent product identifier may be ranked second as a result of the user interaction data 144, the user may be in market for sports jerseys.

The content selection server 130 may determine, using the probabilistic array 146, whether the user has made a purchase of a product that is related to the same parent product identifier as one of the parent product identifiers of eligible product identifiers. The content selection server 130 may perform such determinations iteratively or in parallel. For example, if a top-ranked parent product identifier may be present in the probabilistic array 146, the content selection server 130 may determine whether the second-ranked parent product identifier is present, and so forth until a parent product identifier is identified that is not found in the probabilistic array 146. In other embodiments, the content selection server 130 may determine whether some or all of the parent product identifiers are found in the probabilistic array 146, and determine a re-ranking process for parent product identifiers that are not found in the probabilistic array 146. In the example of FIG. 1, the content selection server 130 may determine that the parent product identifier of "sports jerseys" is not present in the probabilistic array 146, and may select the parent product identifier of "sports jerseys" for presentation.

In some embodiments, any product identifier associated with or linked to the parent product identifier of "sports jerseys" may be selected by the content selection server 130, while in other embodiments, the content selection server 130 may select content for presentation at the content delivery slot. In some instances, the content selection server 130 may both select a product identifier, as well as content for presentation. In FIG. 1, for example, the content selection server 130 may determine that content with an "ATL" logo and text relating to the Atlanta Falcons is to be presented at the content delivery slot.

At a third communication 160, the content selection server 130 may send a content identifier for the selected content, or a product identifier/parent product identifier for a selected product identifier or parent product identifier, to the content delivery server 120. The selected content may be a product identifier instead of a parent product identifier or a content identifier in some embodiments. In some instances, the content selection server 130 may also send a bid amount for presentation of an impression of the content at the content delivery slot.

The content delivery server 120 may receive the content identifier from the content selection server 130, and may send the content and/or the content identifier to the device 110 at a fourth communication 162. In some instances, the content delivery server 120 may conduct a second price auction to determine which content to send to the device 110.

The content may be presented at a display or via speakers of the device 110. In some embodiments, the device 110 may be configured to present audio, such as music, news, weather information, or other audible content to a user. Available content slots may allow for presentation of audio content in between segments of audio presented at the device 110. For example, the user may be streaming music or other audio, and at pauses or breaks in between the music, audio content may be presented. The device 110 may be configured to present audible content and may be, for example, a device such as a television, a laptop computer, a tablet, a computer monitor, a speaker-type device, augmented reality or virtual reality glasses or devices, or another device configured to output audio. The device 110 may include or may utilize a speech interface device or other audio device, such as one or more speakers, that are capable of playing or presenting various types of audio. The device 110 may include one or more microphones to detect ambient sound. The device 110 may operate in conjunction with and/or under the control of a remote network-based speech command service that is configured to receive audio; to recognize speech in the audio; and to perform functions or services in response to the recognized speech, or to generate audible dialog or audible content in response to recognized speech. The device 110 may have one or more microphones and one or more audio speakers or transducers to facilitate speech interactions with the user. The device 110 may receive spoken expressions or utterances from the user and may provide services, perform actions, or facilitate conversation or dialogue in response to the spoken utterances. For example, the user may speak an utterance with a verbal request. In some embodiments, the device 110 may only be activated to listen upon determining that the user has spoken a predefined wake or trigger expression (e.g., "Awake" or "Alexa," etc.), that may be followed by an utterance (e.g., "I'd like to order a taxi."). Provided services may include performing actions or activities, rendering media, obtaining and/or providing information, providing information via generated or synthesized speech via the device 110, initiating Internet-based services on behalf of the user, performing actions relating to home automation and control, and so forth.

The systems, methods, computer-readable media, techniques, and methodologies for filtering data with probabilistic filters for content selection may result in optimal and/or improved selection of content or product identifiers for presentation to specific users. In some embodiments, probabilistic filters may be used and/or applied to one or more data sets, such as clickstream data for a particular user, to generate databases representative of user interactions (e.g., clicks, pauses, content consumption, views, hovers, purchases, etc.) over a time interval. The databases may be used to select content in real-time, while preventing selection of content that may no longer be relevant to a user because, for example, the user has already made a purchase of an item or a related item (e.g., bought a competitor product, etc.).

Example embodiments of the disclosure provide a number of technical features or technical effects. For example, in accordance with example embodiments of the disclosure, certain embodiments of the disclosure may generate databases using probabilistic filters, query databases and/or arrays for keys using probabilistic filters, such as bloom filters, to determine whether the product or a parent product may be found in the data set represented by the database. As a result, content or product identifiers from catalogs or databases of tens of millions of products can be selected in a relatively short time frame, due to increased computing efficiency and improved use of computer resources. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
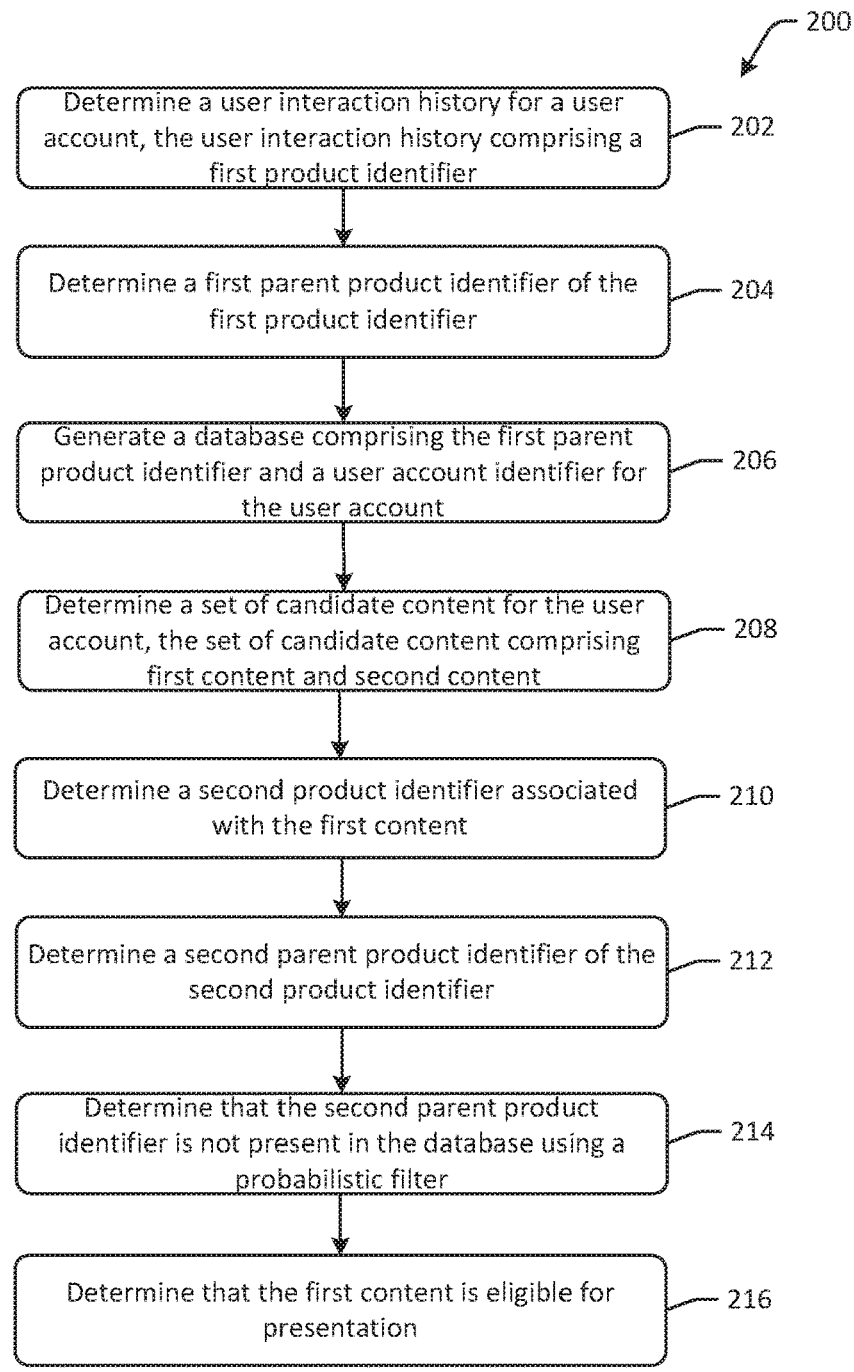
FIG. 2 is an example process flow diagram for filtering data with probabilistic filters for content selection in accordance with one or more embodiments of the disclosure.

Referring to FIG. 2, an example process flow 200 for filtering data with probabilistic filters for content selection in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2.

At block 202 of the process flow 200, a user interaction history for a user account may be determined, the user interaction history including a first product identifier. For example, a user interaction history for a particular user may be determined in response to a bid request or other communication. The user interaction history may indicate, in one example, that the user purchased a particular product. In one embodiment, computer-executable instructions of one or more probabilistic filtering module(s) stored at a server may be executed to ingest, receive, and/or determine clickstream data for a particular user. The clickstream data may be parsed or analyzed, and user interaction data may be extracted. A user account of the user may be determined using, for example, a user identifier. Based at least in part on the clickstream data or other historical data, a set of purchased items may be determined for the user account. The set of purchased items may include the first product identifier, which may be for a first item purchased during a first predetermined time interval. The predetermined time interval may be for a preceding amount of time, such as the last 30 days, for an entirety of a user account's existence, or for another predetermined time interval.

At block 204 of the process flow 200, a first parent product identifier of the first product identifier may be determined. For example, computer-executable instructions of one or more probabilistic filtering module(s) stored at a server may be executed to identify a product tree, a product hierarchy, a browse node, or other classification of products, which can be used to identify a parent product identifier for the first product identifier. The first product hierarchy may be indicative of items related to the first product identifier, such as different versions of a product, different colors, different brands, different sizes, etc. The product hierarchy and/or browse node may include a set of product identifiers that are related to the first product identifier. In some embodiments, parent product identifiers may be a set or cluster of product identifiers that may not be related in a specific product hierarchy, but may be determined to be similar using different processes. For example, a product similarity determination process may include determinations of product manufacturers, determinations of product categories, determinations of distances between products in a vector and/or two-dimensional space, and other processes. Some embodiments may include related products as parent product identifiers. Accordingly, parent product identifiers may be identifiers of similar products without specific hierarchical relationships.

In one example, the first parent product identifier of the first product identifier may be determined by determining a first product category identifier for the first product identifier using a product hierarchy. The first product category identifier may be related to a number of children product identifiers. For example, a product category of "running shoes" may include children products that are shoes from a number of different athletic brands and have different sizes, styles, prices, etc.

At block 206 of the process flow 200, a database comprising the first parent product identifier and a user account identifier for the user account may be generated. The database may be a probabilistic array, a cached database, a high speed datastore, or another database. For example, computer-executable instructions of one or more mapping module(s) stored at a server may be executed to generate a database that maps or otherwise associates the first parent product identifier to the user account identifier. Additional information, such as product identifiers, chronological information, purchase information, and the like may be included in the database. In some embodiments, a probabilistic filter may be used to generate the database. In some embodiments, the database may include product identifiers and/or respective parent product identifiers only for products that are associated with a purchase event in the user interaction data.

At block 208 of the process flow 200, a set of candidate content for the user account may be determined, the set of candidate content comprising first content and second content. In some embodiments, a set of eligible product identifiers may be determined instead of, or in addition to, the set of candidate content. The set of candidate content may be content or products for presentation at a content delivery slot. Candidate content identifiers or candidate product identifiers may be determined, for example, based at least in part on the user interaction data. For example, computer-executable instructions of one or more content selection module(s) stored at a server may be executed to determine candidate content identifiers and/or product identifiers for a user account. Candidate content identifiers and/or product identifiers may be determined based at least in part on targeting criteria for the respective candidate content identifiers and/or product identifiers, in some instances. In other instances, candidate content identifiers and/or product identifiers may be determined based at least in part on a number of times the user interacted with particular content and/or particular product identifiers or related information, previous purchases, and other factors. Product identifiers of products that a user has purchased previously, or purchased within a predetermined timeframe, may be ineligible and may not be candidates.

At block 210 of the process flow 200, a second product identifier associated with the first content may be determined. For example, a piece of content may be associated with one or more product identifiers. A piece of content may be from a brand named Peloton and may be associated with a product identifier for an indoor exercise bike. Other content may feature certain products and include links to product identifiers for the featured products.

At block 212 of the process flow 200, a second parent product identifier of the second product identifier may be determined. The second parent product identifier may be determined based at least in part on a second product hierarchy for the second product identifier. For example, computer-executable instructions of one or more probabilistic filtering module(s) stored at a server may be executed to identify a product tree, a product hierarchy, a browse node, or other classification of products for the second product identifier, which can be used to identify a second parent product identifier for the second product identifier.

At block 214 of the process flow 200, it may be determined that the second parent product identifier is not present in the database using a probabilistic filter. For example, computer-executable instructions of one or more probabilistic filtering module(s) stored at a server may be executed to query or otherwise determine that the database does not include the second parent product identifier. The database may include parent product identifiers for some or all of the products that the user account has purchased. Determining that the second parent product is not in the database may indicate that the user has not purchased a product associated with the second parent product identifier. In some instances, an optional additional query or determination may be made to determine whether the user account is associated with a purchase of the second product identifier itself, in addition to the second parent product identifier. This additional determination may be for a certain time period that may be shorter than the determination for the parent product identifier (e.g., has the user purchased this particular item in the last 30 days?, etc.).

At block 216 of the process flow 200, it may be determined that the first content is eligible for presentation. Because the second parent product identifier is not present in the database, the user account indicates that the user has not purchased a product related to the second parent product identifier. Accordingly, the second parent product identifier may lead to a conversion or may otherwise impact the user's behavior after presentation. The first content may therefore be eligible for presentation. A selection of one or more pieces of eligible content may be made and used to determine bid amounts and other values, and the selected content may be presented to the user.

If it was determined at block 214 that the second parent product identifier was in the database, or was possibly in the database (e.g., greater than 0% chance, etc.), the second parent product identifier may be determined to be ineligible for presentation. In some instances, the second parent product identifier may be ineligible indefinitely, while in other instances, the second parent product identifier may be ineligible for presentation for a predetermined length of time.

Figure 3:
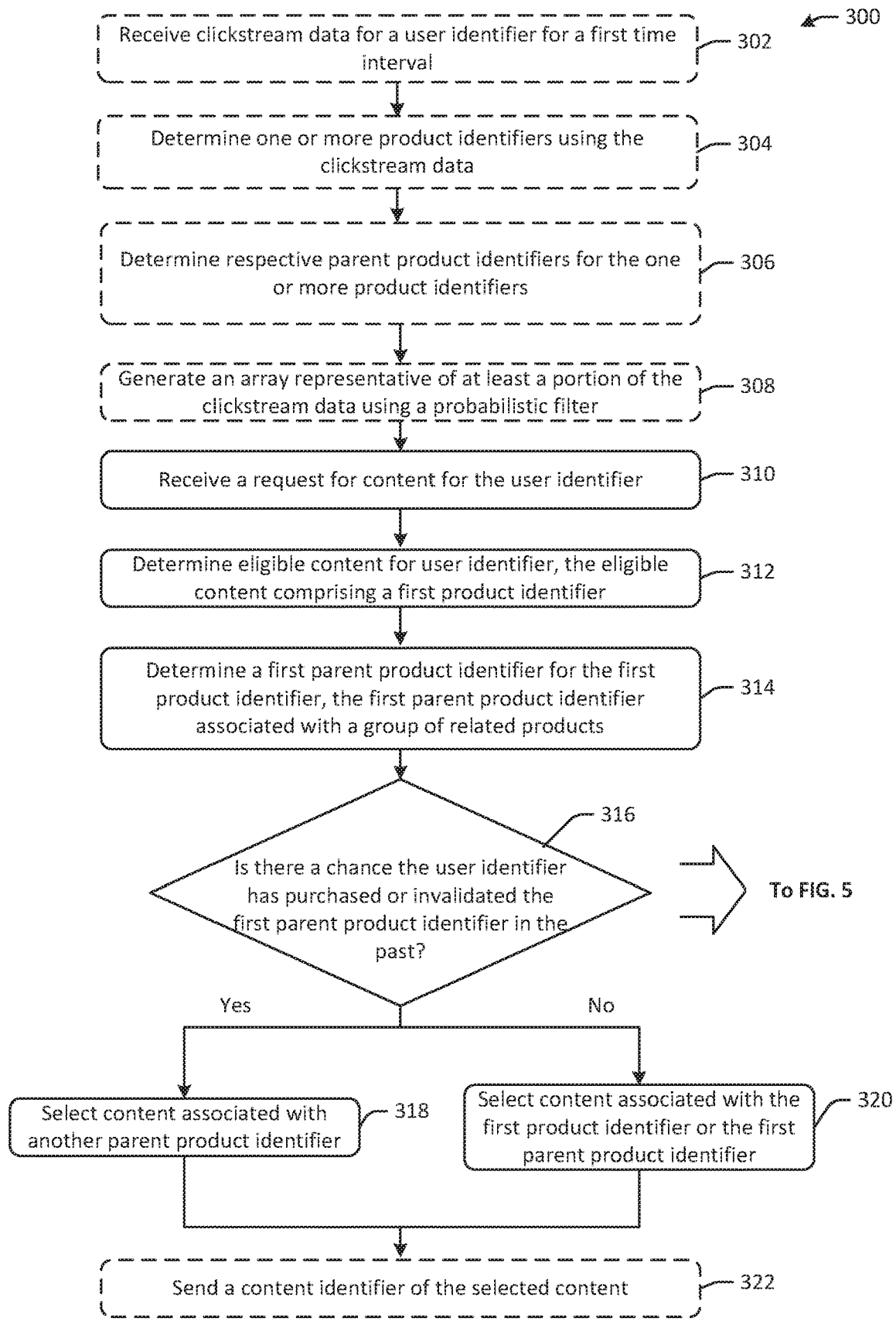
FIG. 3 is an example process flow diagram for selecting content using a probabilistic filter in accordance with one or more embodiments of the disclosure.

FIG. 3 depicts an example process flow 300 for selecting content using a probabilistic filter in accordance with one or more embodiments of the disclosure. The process flow 300 may be used, in some embodiments, by one or more content selections servers to select content for presentation to a particular user. Content selected as a result of execution of some or all of the operations of the process flow 300 may have an increased likelihood of engaging the user, an increased relevance to a particular user, and/or an increased likelihood of user interaction with the content. Content may include a product identifier that is presented as part of, or otherwise associated with, the content.

At optional block 302, clickstream data for a user identifier for a first time interval may be determined. For example, a portion of clickstream data during a first time interval, such as the last 24 hours, the last 30 days, in real-time, etc., may be received from another server, or may be determined from one or more datastores. In one embodiment, a user account may be determined using a user identifier.

At optional block 304, one or more product identifiers may be determined using at least a portion of the clickstream data. The one or more product identifiers may be product identifiers that the user account has purchased, or for which a purchase event is associated with. In one embodiment, a set of product identifiers of purchased items that a user has purchased may be determined using the user account. The set of purchased items may include, for example, a first product identifier for a first item purchased during a first predetermined time interval, such as during the last 12 months.

At optional block 306, respective parent products identifiers for the one or more product identifiers may be determined. The product identifiers may be products that the user has purchased, and respective parent products for those products that have been purchased may be determined. The parent product identifiers may be determined using a product hierarchy, a browse node, a product tree, or another relational database between products. In some instances, parent product identifiers may be product category identifiers.

At optional block 308, an array representative of at least a portion of the clickstream data may be generated using a probabilistic filter. For example, a probabilistic array may be generated that has respective values in certain positions within the array that are modified after a purchase event of a particular product is determined. In some embodiments, the array may be modified based at least in part on a parent product identifier of a purchased product. Certain product identifiers or parent product identifiers may be mapped to corresponding positions in the array. In some embodiments the array may be a locally stored database, a cached database, or another array. The array may be queried or otherwise used to determine whether a particular parent product identifier or product identifier is, or is possibly, in the probabilistic array, and therefore in the clickstream data as a purchased product or parent product identifier. The array may include a number of values indicative of a set of purchased items and their respective product category identifiers. The array may be generated or used with a probabilistic filter, such as a bloom filter. The array may be stored in a database associated with the user account and/or at a local memory device.

At block 310, a request for content or for a product identifier may be received, where the request is associated with the user identifier. For example, the content selection server may receive a bid request for a bid amount, a content identifier, a product identifier, a parent product identifier, and/or other information. The content selection server may extract user information, such as the user identifier, from the request.

At block 312, eligible content for the user identifier may be determined, where the eligible content includes a first product identifier. For example, the content selection server may determine, using the user account and/or at least a portion of the clickstream data, a set of items that the user has interacted with over a particular time period, and/or a set of items or content for which the user satisfies respective targeting criteria. Eligible content and product identifiers may be determined based at least in part on user characteristics, such as age, location, income, preferences, demographic, and other targeting criteria. In one example, the first product identifier may be an autographed Atlanta Falcons football.

At block 314, a first parent product identifier for the first product identifier may be determined, where the first parent product identifier is associated with a group of related products. For example, if the first product identifier is an autographed Atlanta Falcons football, the first parent product identifier may be determined to be autographed footballs.

At determination block 316, a determination is made as to whether there is a chance that the user identifier has purchased or otherwise invalidated the first parent product identifier in the past. For example, computer-executable instructions of one or more probabilistic filtering module(s) stored at a server may be executed to determine whether there is a chance that the first parent product identifier is present in the array. The array may be queried with a key, where the key is the first parent product identifier. The output or result of the query may be a definite or indefinite output. For example, the output may be that the first parent product identifier is definitely not in the array, or that the first parent product is definitely in the array. In another example, the output may be that the first parent product identifier may possibly be in the array. Other configurations and outputs may be possible based at least in part on the probabilistic filter and/or algorithm applied. Additional examples are discussed with respect to FIG. 5.

If it is determined at determination block 316 that there is a chance that the user identifier or user account has purchased or invalidated the first parent product identifier in the past, the process flow 300 may proceed to block 318. For example, the content selection server may determine that a likelihood the first parent product identifier (which may be a product category identifier) is in the array or the database is greater than 0 using a bloom filter.

At block 318, content associated with another parent product identifier may be selected. For example, if the array indicates that there is a chance the user has already bought an autographed football, or that the user has definitely bought the Atlanta Falcons autographed football, the content selection server may determine another parent product identifier for a different product that the user has interacted with that has not been purchased or invalidated, and may select content associated with that parent product identifier for presentation. The selected content may therefore be more relevant to the user than content associated with a product or parent product for which the user has already made a purchase. The content associated with the first parent product identifier may be blocked from selection or prevented from being selected for presentation.

If it is determined at determination block 316 that there is no chance that the user identifier or user account has purchased or invalidated the first parent product identifier in the past, the process flow 300 may proceed to block 320. For example, the content selection server may determine that the first parent product identifier is not present in the array or the database, which may indicate that the user has not purchased a product related to the first parent product identifier in the past.

At block 320, content associated with the first parent product identifier or the first product identifier may be selected. For example, the content selection server may determine that the user has not made a purchase of a product related to autographed footballs, and may therefore select content related to the autographed footballs parent product identifier.

At optional block 322, a content identifier and/or a product identifier may be sent for the selected content or product identifier. In some instances, before content is selected, a secondary check or determination may be made as to whether the user has purchased the product identifier itself, as opposed to a product linked to the parent product identifier. This may allow for determinations of specific product identifiers in a recent portion of the user account interaction data in the event that the user has recently been presented with certain content or made a purchase of a particular product. For example, the content selection server may determine, prior to sending the content identifier (which may be in response to a bid request), a subset of purchased items during a second predetermined time interval that is shorter than the first predetermined time interval. For example, the second predetermined time interval may be the last 30 days, whereas the first predetermined time interval may be the last 12 months. The content selection server may determine that the subset of purchased items does not include an item or product identifier for the product, which may indicate that the user has not interacted with the product identifier recently.

Figure 4:
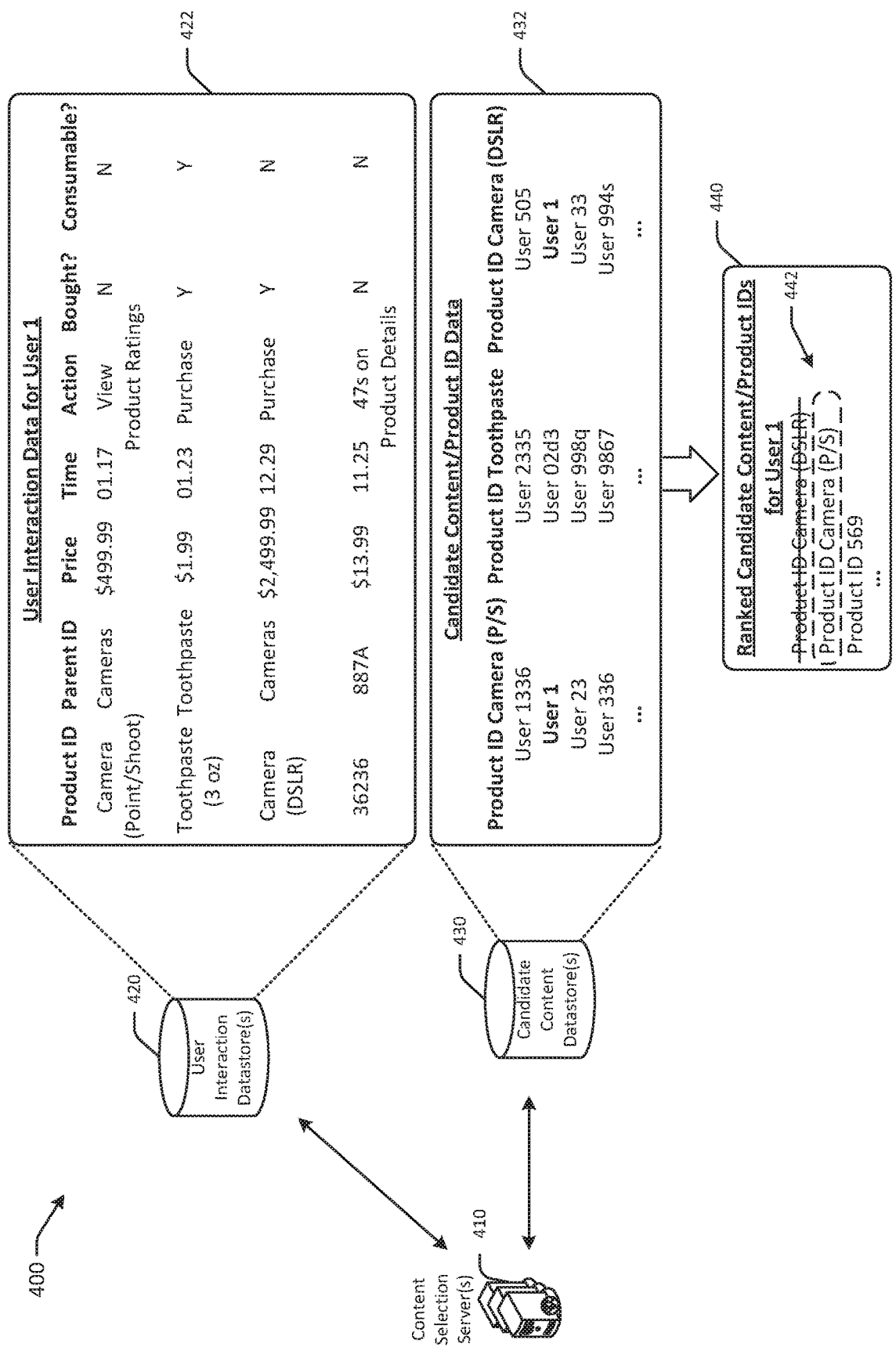
FIG. 4 is a schematic drawing of an example datastore with user interaction data and an example datastore with candidate content ranked for a user in accordance with one or more embodiments of the disclosure.

FIG. 4 depicts an example datastores 400 in accordance with one or more embodiments of the disclosure. In particular, FIG. 4 includes one or more content selection servers 410 in communication with a user interaction datastore(s) 420 and a candidate content datastore(s) 430. The user interaction datastore(s) 420 may include user interaction data linked to respective user identifiers. For example, first user interaction data 422 may be for a first user identifier, such as "User 1." The first user interaction data 422 may include product identifier data for products that the user has interacted with. For example, the user may have interacted with products such as a point and shoot camera, 3 oz. toothpaste, a DSLR camera, and another product identifier "36236." For one or more, or each, of the product identifiers, a parent product identifier may be determined and/or stored at the user interaction datastore(s) 420. For example, the point and shoot camera may be associated with a parent product identifier of "cameras," the 3 oz. toothpaste may be associated with a parent product identifier of "toothpaste," the DSLR camera may be associated with a parent product identifier of "cameras," and the product identifier "36236" may be associated with a parent product identifier of "887A." Price information for one or more, or each, of the product identifiers may be determined and/or stored at the user interaction datastore(s) 420, as well as a time of the user interaction. Action data, or interaction event data, may be determined for respective product identifiers. As shown in FIG. 4, example action events may include viewing product ratings, purchase events, a time spent consuming product details, and other actions. Information related to whether the product identifier is associated with a purchase event may be available (e.g., in one example, a binary "Yes" or "No" data entry may be available, etc.), as well as an indication of whether the product identifier is a consumable product. If the product identifier is a consumable product, then the product identifier may be eligible for presentation to the user after a time period that may correspond to the consumption period for the product identifier. Consumable products may be linked to a reset time for the consumable product, which may be an expected length of time for consumption of the consumable. Purchases of consumable products may be automatically deleted or ignored until the reset time is complete. Consumable products may be determined via analysis of products that are purchased by users repeatedly, products for which a subscribe and save option is available, and the like. Other user interaction data may include additional or fewer, or different, data for particular users.

Clickstream data may be processed so as to avoid counting user interactions with products that occur during a grace period, such as shortly before or after (e.g., 1 hour, etc.) a purchase event of a product. For example, a user may buy a product and then return to the product page for information. Such an event may be ignored or treated as neutral data in the clickstream data because it may not be indicative of a user's intent to purchase.

The candidate content datastore(s) 430 may include candidate content and/or product identifier data for content or product identifiers for which the user is eligible. For example, the user may satisfy targeting criteria for the content, or may have interacted with the product identifier in the past. In some embodiments, as illustrated in FIG. 4, the candidate content datastore(s) 430 may include a set of product identifiers for presentation, and a corresponding set of users that are eligible for presentation of content associated with that particular product identifier. For example, for the product identifier of the point and shoot camera, users 1336, 1, 23, and 336 may be eligible to be presented with content associated with the point and shoot camera identifier. User 1 may be eligible because User 1 did not purchase the point and shoot camera. In another example, the eligible users for the product identifier for toothpaste may not include User 1 because User 1 already purchased toothpaste. However, User 1 may become eligible after a month, or after another time period since the toothpaste that was purchased by User 1 is a consumable item that may take a month to consume. User 1 may also be an eligible user for presentation of content associated with the product identifier of DSLR camera.

The candidate content datastore(s) 430 may include a set of ranked content or product identifiers for particular users. For example, a first set 440 of ranked content may be determined for User 1 and may indicate that the DSLR camera is a top-ranked product identifier for User 1, whereas the point and shoot camera is a second ranked product identifier, and so forth. The content selection server 410 may use the ranked data, or may generate the rankings in real-time, to determine a content selection for the user. For example, the content selection server may determine that User 1 may have made a purchase of the DSLR camera using the user interaction data 422 for User 1, and may therefore select the second ranked product identifier for the point and shoot camera instead of the top-ranked DSLR camera for presentation to the user. While the point and shoot camera may be in the same product category of cameras, a price difference between the cameras may be sufficient to allow the selection of the point and shoot camera identifier.

Figure 5:
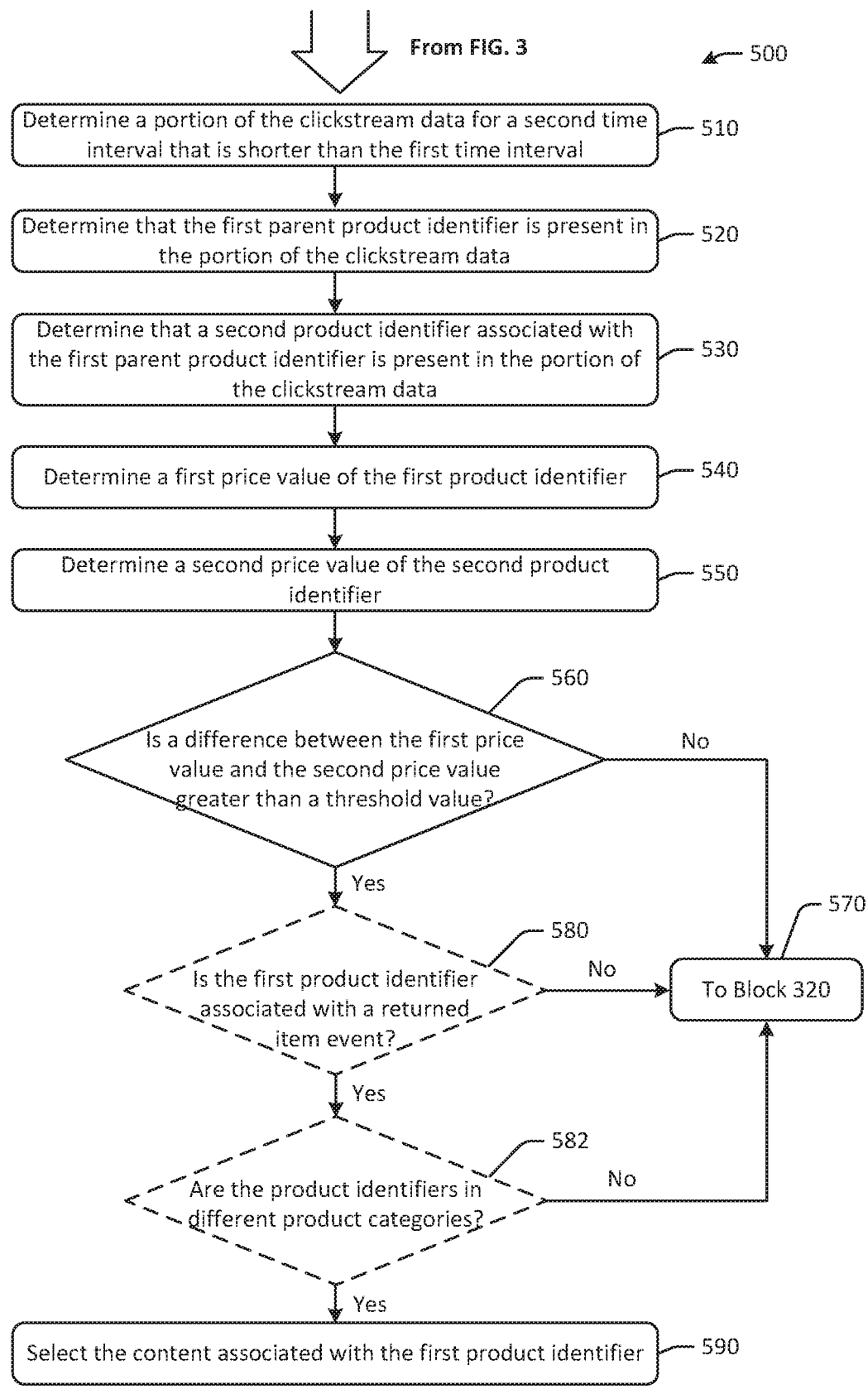
FIG. 5 is an example process flow diagram for selecting content based at least in part on a threshold difference in one or more values in accordance with one or more embodiments of the disclosure.

FIG. 5 is an example process flow 500 for selecting content based at least in part on a threshold difference in one or more values in accordance with one or more embodiments of the disclosure. FIG. 5 may be used to determine whether a user has purchased or invalidated a product identifier. At block 510, a portion of clickstream data for a user is determined. The portion of the clickstream data may be for a shorter time interval than an entirety of the user's available clickstream data (e.g., the last 24 hours, etc.).

At block 520, it may be determined that the first parent product identifier is present in the portion of the clickstream data. For example, the user may have recently purchased a product associated with the first parent product identifier. With reference to FIG. 4, the user may have recently purchased a DSLR camera that has a parent product identifier of cameras.

At block 530, it may be determined that a second product identifier associated with the first parent product identifier is present in the portion of the clickstream data. For example, with reference to FIG. 4, the user may have recently interacted with a point and shoot camera.

At block 540, a first price value of the first product identifier may be determined. The first price value may be determined based at least in part on the user interaction datastore(s) 420. The price value of the DSLR camera may be, for example, $2,499.99 in FIG. 4.

At block 550, a second price value of the second product identifier may be determined. The second price value may be determined based at least in part on the user interaction datastore(s) 420. The price value of the point and shoot camera may be, for example, $499.99 in FIG. 4.

At determination block 560, it may be determined whether a difference between the first price value and the second price value is greater than a threshold value. For example, a difference between the first value of the first product identifier and the second value of the second product identifier may be determined. In the example of FIG. 4, a difference of $2,000 ($2,499.99−$499.99) may be determined. The difference may be compared to a threshold value. The threshold value may be a category differential threshold or may represent a difference in product category, product class, product functionality, or other distinctions between products that may share the same or a similar parent product identifier. Such products, while they may be in the same product category, may serve different purposes for the user, and so may still be eligible for presentation to the user regardless of whether the user has made a purchase of a similar product in the past. The threshold value may be an absolute value, a product category specific value, a product specific value, a percentage of one of the price values, and the like.

If it is determined at determination block 560 that the difference is not greater than the threshold value, the process flow 500 may proceed to block 570 and/or return to block 320 of FIG. 3.

If it is determined at determination block 560 that the difference is greater than the threshold value, the process flow 500 may proceed to optional determination block 580. At optional determination block 580, a determination may be made as to whether the first product identifier is associated with a returned item event. For example, a user may purchase an item or a product, and then return the product. In such cases, the user may be eligible for content associated with the product even though the user made a purchase of the product, due to the returned item event.

If it is determined at determination block 580 that the product is not associated with a returned item event, the process flow 500 may proceed to block 570 and/or return to block 320 of FIG. 3.

If it is determined at determination block 580 that the product is associated with a returned item event, the process flow 500 may proceed to optional determination block 582. At optional determination block 582, a determination may be made as to whether the first product identifier and the second product identifiers are in different product categories. For example, if the first product identifier is in a personal hygiene category (e.g., for a product like toothpaste or mouthwash, etc.), and the second product identifier is in an electronics product category (e.g., a smartphone, etc.), the first product identifier may be determined to be in a different product category than the second product identifier. If it is determined at determination block 582 that the product identifiers are not in different product categories, the process flow 500 may proceed to block 570 and/or return to block 320 of FIG. 3.

If it is determined at determination block 582 that the product identifiers are in different product categories, the process flow 500 may proceed to block 590, at which content that is associated with the first product identifier may be selected for presentation. In one embodiment, the user interaction history may be analyzed to determine whether there is a product return event associated with a particular product identifier. If the product identifier is associated with a return event, selection of content associated with that product identifier may be unblocked or otherwise permitted. Return item or return product events may include return authorization identifiers. If a product identifier is associated with a return event, the product identifier may be ignored if it appears in the clickstream data for a user or as a purchased item, and/or may be whitelisted as a permitted product for a predetermined length of time.

Content or product identifiers that are determined to be eligible for a particular user may be propagated as eligible for users that are related to the user, such as household members or other related users. Related users may be determined, in one example, by identifying user accounts with the same shipping address, linked online membership logins, etc. Similarly, content that is determined to be ineligible for a user may be propagated across related users. For example, if a user has purchased a television, it may be unlikely that another user in the same household will purchase a television. Accordingly, some or all of the household or related users may be prevented from being presented content or product identifiers related to televisions.

Figure 6:
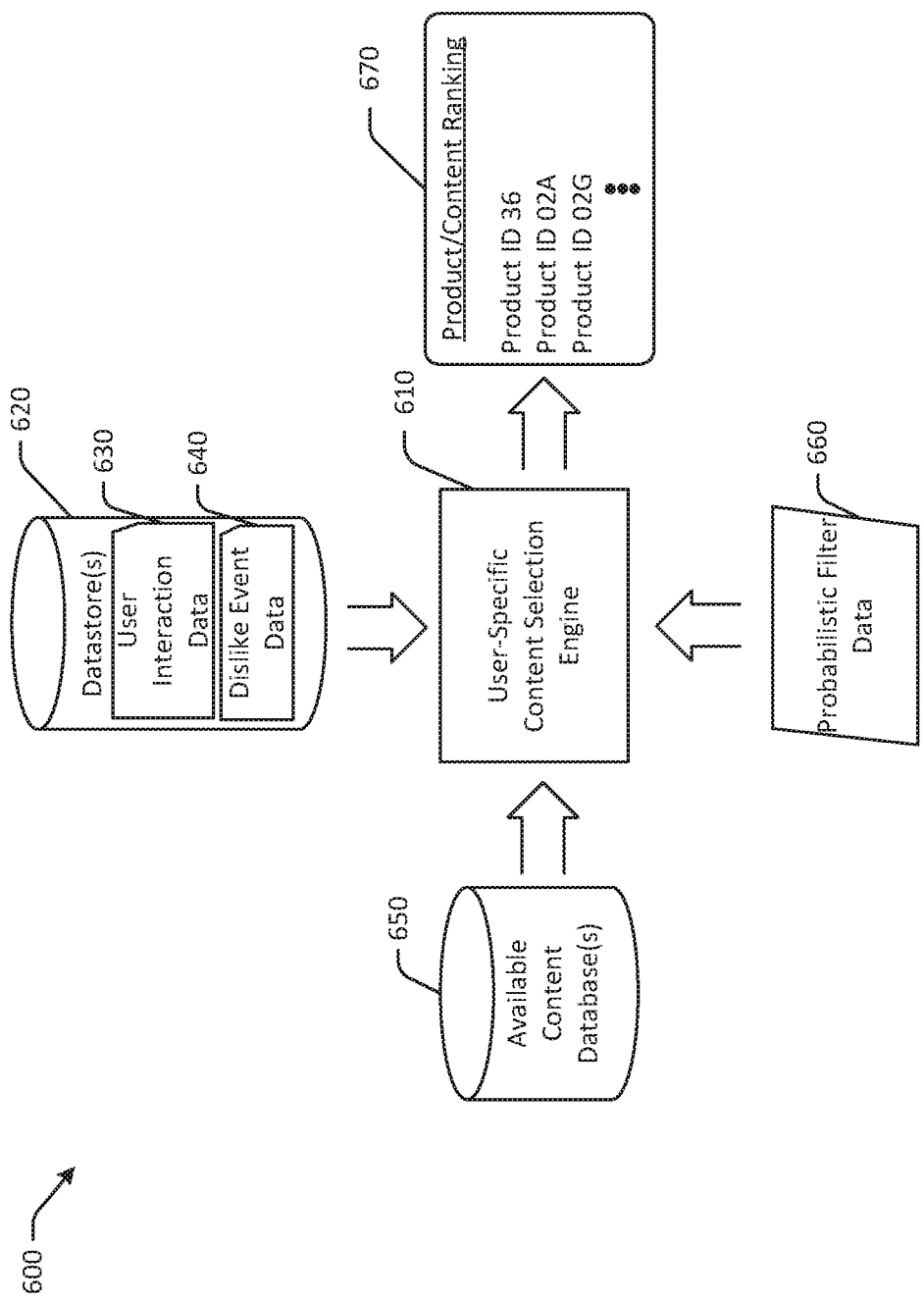
FIG. 6 is an example hybrid system and process flow diagram for determining user-specific content selection in accordance with one or more embodiments of the disclosure.

FIG. 6 depicts an example hybrid system and process flow diagram 600 for determining user-specific content selection in accordance with one or more embodiments of the disclosure. In FIG. 6, a user-specific content selection engine 610 may include computer-executable instructions to determine user-specific content selections. The user-specific content selection engine 610 may be stored at a user device or at one or more remote servers. The user-specific content selection engine 610 may be configured to select content and/or product identifiers or parent product identifiers for presentation to specific users. One or more inputs may be received by or sent to the user-specific content selection engine 610. For example, in FIG. 6, the user-specific content selection engine of 610 may be in communication with a datastore(s) 620. The datastore(s) 620 may include user interaction data 630 and dislike event data 640. The user-specific content selection engine 610 may determine user interaction data for a particular user using the datastore(s) 620. The datastore(s) 620 may include databases or probabilistic arrays representing user interaction data for one or more users. The dislike event data 640 may include data related to specific user preferences with respect to previously presented content and/or product identifiers. For example, if a user did not like, or disliked, certain content that was presented to the user, the user may dislike the content, for example, by clicking an "X" in a corner of the content. An indication of the dislike event may be associated with the content and the user identifier in the dislike event data 640. Content associated with a dislike event may be blocked from selection for presentation for the user and/or for users that are related to the user (e.g., household users, etc.).

The user-specific content selection engine 610 may be in communication with an available content database(s) 650. The available content database(s) 650 may include information related to content and/or product identifiers that are available for presentation to users. In some instances, the available content database(s) 650 may include data related to eligible content for certain users. In such instances, eligibility determinations may be completed before a bid request is received or may otherwise be pre-fetched. The available content database(s) 650 may include product information such as parent product identifiers for available products, model numbers, pricing information, rating information, product family identifiers, inventory level information, and other product related information. The user-specific content selection engine 610 may access the available content database(s) 650 to determine products that are related to a selected product or a product that may be selected for presentation. For example, the user-specific content selection engine 610 may determine parent, child, or sibling products by analyzing a browse node or other hierarchy of products.

The user-specific content selection engine 610 may be in communication with probabilistic filter data 660. The probabilistic filter data 660 may be stored or cached locally or remotely. The probabilistic filter data 660 may include one or more probabilistic arrays, probabilistic algorithms, filtered data that was processed or filtered using one or more probabilistic filters, and other information. The probabilistic filter data 660 may include data for one or more specific user accounts or user identifiers. The probabilistic filter data 660 may include an array that is updated periodically or in real-time in response to purchase events or other user interactions with certain products. The user-specific content selection engine 610 may access the probabilistic filter data 660 to determine whether certain product identifiers or parent product identifiers are present or are not present in a specific user account.

Using some or all of the information determined and/or received from the datastore(s) 620, the available content database(s) 650, and/or the probabilistic filter data 660, the user-specific content selection engine 610 may generate a set of one or more product, parent product, or content identifiers that may be suitable for presentation to a specific user. In some instances, the user-specific content selection engine 610 may generate a ranking 670 of one or more eligible products or parent products that can be presented to a user, or for which associated content can be presented to a user. The user-specific content selection engine 610 may implement one or more machine learning algorithms to generate product and content rankings. The recommended products or content may result in optimized campaign performance if presented to the user.

One or more operations of the method, process flows, or use cases of FIGS. 1-6 may have been described above as being performed by a user device, or more specifically, by one or more program module(s), applications, or the like executing on a device. It should be appreciated, however, that any of the operations of methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
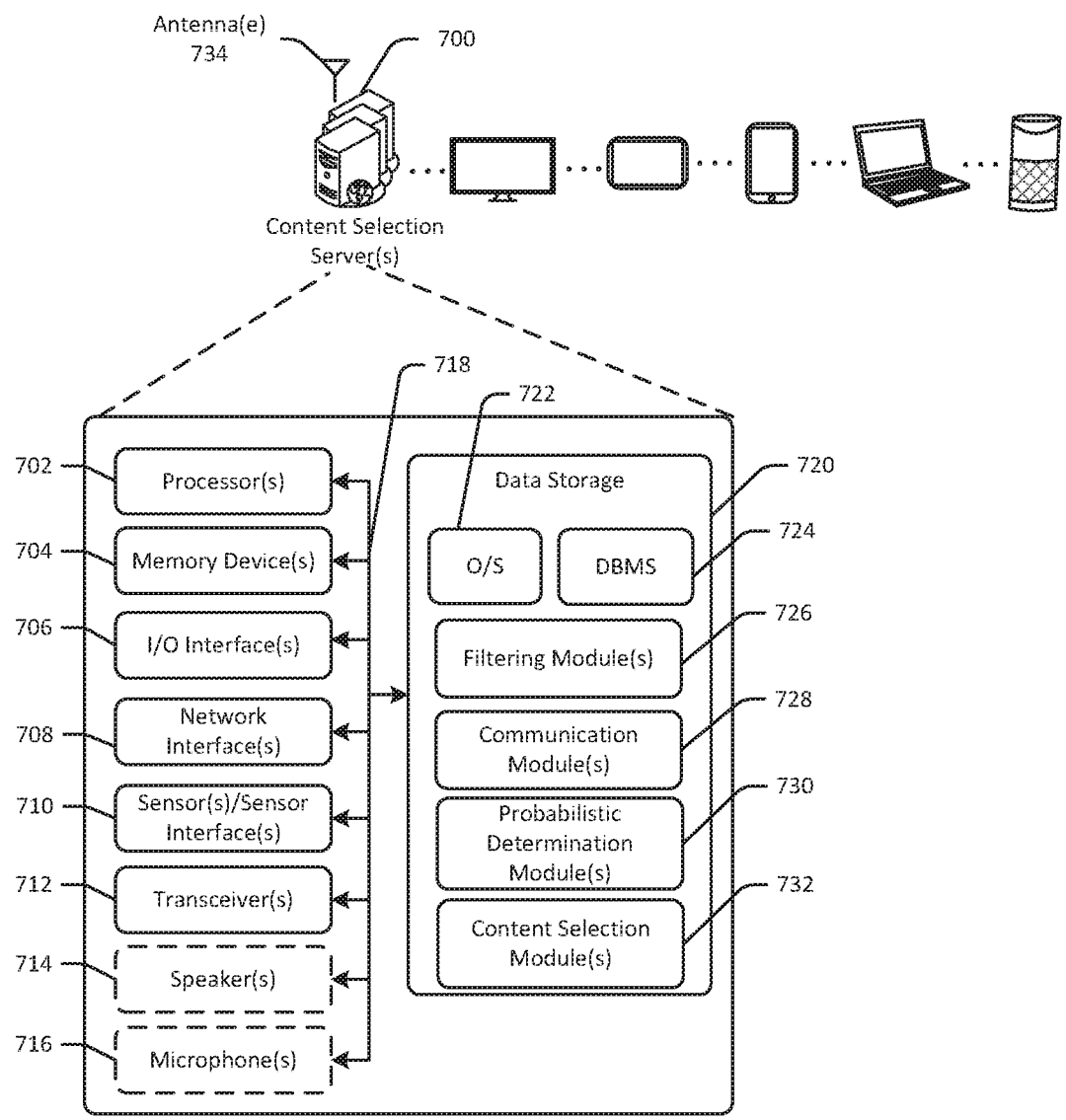
FIG. 7 schematically illustrates an example architecture of a content selection server in accordance with one or more embodiments of the disclosure.

FIG. 7 is a schematic block diagram of one or more illustrative content selection server(s) 700 in accordance with one or more example embodiments of the disclosure. The content selection server(s) 700 may include any suitable computing device including, but not limited to, a server system, a mobile device such as a smartphone, tablet, e-reader, wearable device, or the like; a desktop computer; a laptop computer; a content streaming device; a set-top box; or the like. The content selection server(s) 700 may correspond to an illustrative device configuration for the content selection servers or content delivery servers of FIGS. 1-6.

The content selection server(s) 700 may be configured to communicate via one or more networks with one or more servers, user devices, or the like. The content selection server(s) 700 may be configured to determine eligible content, determine user purchase or interaction data, interact with or perform auction bidding operations, selection of content or product identifiers, and other operations. The content selection server(s) 700 may be configured to deliver or cause delivery of one or more pieces of content and may further be configured to engage in a bidding process for auctions to present content. In some embodiments, a single remote server or single group of remote servers may be configured to perform more than one type of content delivery functionality.

The content selection server(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content selection server(s) 700 may include one or more processors (processor(s)) 702, one or more memory devices 704 (generically referred to herein as memory 704), one or more input/output ("I/O") interfaces 706, one or more network interfaces 708, one or more sensors or sensor interfaces 710, one or more transceivers 712, one or more optional speakers 714, one or more optional microphones 716, and data storage 720. The content selection server(s) 700 may further include one or more buses 718 that functionally couple various components of the content selection server(s) 700. The content selection server(s) 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the content selection server(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the content selection server(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more filtering module(s) 726, one or more communication module(s) 728, one or more probabilistic determination module(s) 730, and/or one or more content selection module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the content selection server(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, historical data for campaigns, inventory data, campaign performance data, and/or other information.

The processor(s) 702 may be configured to access the memory 704 and execute computer-executable instructions loaded therein. For example, the processor(s) 702 may be configured to execute computer-executable instructions of the various program module(s), applications, engines, or the like of the content selection server(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the filtering module(s) 726 may include computer-executable instructions, code, or the like that responsive to execution by one or more of the processor(s) 702 may perform functions including, but not limited to, generating bloom filter arrays, generating or applying probabilistic filters to data sets, querying databases for keys or certain information, determining whether a specific element is present or is possibly or likely present in an array or a database, determining whether a specific element is not present in an array or a database, retrieving, ingesting, receiving, or determining clickstream data and other user data, determining parent product identifiers, and the like.

The communication module(s) 728 may include computer-executable instructions, code, or the like that responsive to execution by one or more of the processor(s) 702 may perform functions including, but not limited to, communicating with remote servers, communicating with remote datastores, sending or receiving notifications, communicating with cache memory data, and the like.

The probabilistic determination module(s) 730 may include computer-executable instructions, code, or the like that responsive to execution by one or more of the processor(s) 702 may perform functions including, but not limited to, determining a probability that a certain element or key is present in a dataset, determining a probability of whether a bid amount was a winning bid amount, determining whether to select certain content or a certain product identifier, and the like.

The content selection module(s) 732 may include computer-executable instructions, code, or the like that responsive to execution by one or more of the processor(s) 702 may perform functions including, but not limited to, determining base bid values, determining bid modifiers, determining viewability constraint statuses, determining eligibility for certain content or product identifiers for specific users, determining whether content or a product identifier has been previously presented to a user or a user device, and the like.

Referring now to other illustrative components depicted as being stored in the data storage 720, the O/S 722 may be loaded from the data storage 720 into the memory 704 and may provide an interface between other application software executing on the content selection server(s) 700 and hardware resources of the content selection server(s) 700. More specifically, the O/S 722 may include a set of computer-executable instructions for managing hardware resources of the content selection server(s) 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content selection server(s) 700 is a mobile device, the DBMS 724 may be any suitable light-weight DBMS optimized for performance on a mobile device.

Referring now to other illustrative components of the content selection server(s) 700, the input/output (I/O) interface(s) 706 may facilitate the receipt of input information by the content selection server(s) 700 from one or more I/O devices as well as the output of information from the content selection server(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content selection server(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The content selection server(s) 700 may further include one or more network interface(s) 708 via which the content selection server(s) 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna(e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the content selection server(s) 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the content selection server(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 714 may be any device configured to generate audible sound. The microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content selection server(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the content selection server(s) 700 may include alternate and/or additional hardware, software, or firmware components beyond those described or depicted without departing from the scope of the disclosure. More particularly, it should be appreciated that software, firmware, or hardware components depicted as forming part of the content selection server(s) 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by one or more computer processors coupled to at least one memory of a device, a bid request for a content delivery slot at a webpage, the bid request comprising a user identifier;

determining a first user account and a second user account using the user identifier;
determining a set of purchased items using the first user account, wherein the set of purchased items comprises a first product identifier for a first item purchased during a first predetermined time interval;
determining a first product hierarchy for the first item using the first product identifier, the first product hierarchy indicative of items related to the first product identifier;
determining a first product category identifier for the first item using the first product hierarchy, wherein the first product category identifier is related to a plurality of children product identifiers;
generating an array of values indicative of the set of purchased items and the first product category identifier using a bloom filter, wherein the array of values is a probabilistic array;
storing the array of values in a database associated with the first user account;
automatically modifying values in the probabilistic array to map values of characters in certain positions to represent updated user interactions;
determining a set of candidate content for presentation at the content delivery slot, the set of candidate content comprising first content for a second item and second content for a third item;
determining a second product hierarchy for the second item;
determining a second product category identifier for the second item using the second product hierarchy, wherein the second product category identifier is the same as the first product category identifier;
determining that a likelihood the second product category identifier is in the database is greater than 0 using the bloom filter;
determining a third product hierarchy for the third item;
determining a third product category identifier for the third item using the third product hierarchy;
determining that the third product category identifier is not in the database using the bloom filter;
transmitting a response to the bid request, the response comprising a bid amount and a content identifier for the second content;
determining that the second content is eligible for presentation to the second user account, wherein the second user account is associated with the first user account;
selecting a version of the second content for presentation to the second user account based at least in part on a user interaction history associated with the first user account;
determining a time for the presentation of the version of the second content, wherein the time corresponds to a break in streaming audio content;
sending the version of the second content for presentation at the content delivery slot; and
causing the version of the second content to be presented at the time by a device associated with the second user account.

2. The method of claim 1, further comprising:
determining, prior to sending the response to the bid request, a subset of purchased items during a second predetermined time interval that is shorter than the first predetermined time interval; and
determining that the subset of purchased items does not include an item identifier for the third item.

3. The method of claim 1, further comprising:
determining that the first product identifier is associated with a return authorization identifier for the first user account; and
(i) ignoring the first product identifier in the set of purchased items, or (ii) preapproving the first content for a predetermined length of time.

4. The method of claim 1, wherein the set of candidate content further comprises third content for a fourth item, the method further comprising:
determining a fourth product hierarchy for the fourth item;
determining that a fourth product category identifier for the fourth item is the same as the first product category identifier;
determining that a difference between a first value of the fourth item and a second value of the first item is greater than a predetermined value; and
determining a ranking of the second content and the third content using the user interaction history associated with the first user account, wherein the third content is ranked higher than the second content.

5. A method comprising:
determining, by one or more computer processors coupled to at least one memory of a device, a user interaction history for a first user account, the user interaction history comprising a first product identifier;
determining a second user account associated with the first user account;
determining a first parent product identifier of the first product identifier, wherein the first parent product identifier is a superset product category that encompasses a first product category of the first product identifier;
generating a database comprising the first parent product identifier and a user account identifier for the first user account in a probabilistic array;
automatically modifying values in the probabilistic array to map values of characters in certain positions to represent updated user interactions;
determining a set of candidate content for the first user account, the set of candidate content comprising first content and second content;
determining a second product identifier associated with the first content;
determining a second parent product identifier of the second product identifier, wherein the second parent product identifier is a superset product category that encompasses a second product category of the second product identifier;
determining that the second parent product identifier is not present in the database using a bloom filter;
determining that the second user account has not purchased a product associated with the first content within a predetermined period of time;
determining that the first content is eligible for presentation to the first user account;
selecting a version of the first content for audible presentation to the first user account based at least in part on the user interaction history;
determining a time for the audible presentation of the first content by a device associated with the second user account, wherein the time corresponds to a break in streaming audio content;

transmitting the version of the first content to the device associated with the first user account for presentation; and causing the first content to be presented at the time by the device associated with the second user account.

6. The method of claim 5, wherein generating the database comprising the first parent product identifier and the user account identifier for the first user account comprises using the bloom filter to generate the database comprising the first parent product identifier and the user account identifier for the first user account.

7. The method of claim 5, further comprising:
determining a third product identifier associated with the second content;
determining a third parent product identifier of the third product identifier, wherein the third parent product identifier is a superset product category that encompasses a third product category of the third product identifier; and
determining that the third parent product identifier has a likelihood greater than 0 of being in the database using the bloom filter.

8. The method of claim 7, further comprising:
determining that the second content is ineligible for presentation for a predetermined length of time.

9. The method of claim 8, wherein the database is a first database, the method further comprising:
determining that the third parent product identifier is a consumable product;
determining a reset time for the consumable product, wherein the predetermined length of time is the reset time; and
generating a second database after the reset time has elapsed, wherein the third parent product is not in the second database.

10. The method of claim 7, further comprising:
determining that a difference between a first value of the first product identifier and a second value of the third product identifier satisfies a category differential threshold; and
determining that the second content is eligible for presentation.

11. The method of claim 5, wherein the user interaction history comprises user interaction data over a first time interval, the method further comprising:
determining a third product identifier associated with the second content;
determining a portion of the user interaction history over a second time interval that is shorter than the first time interval;
determining that the portion comprises the third product identifier;
determining that the second content is ineligible for presentation; and
blocking selection of the second content for presentation.

12. The method of claim 11, wherein determining that the second content is ineligible for presentation comprises determining that the second content is ineligible for presentation to the first user account, the method further comprising:
determining a shipping address for the first user account;
determining that the second user account has the shipping address; and
determining that the second content is ineligible for presentation to the second user account.

13. The method of claim 11, further comprising:
determining that the user interaction history comprises a product return event associated with the third product identifier; and
unblocking selection of the second content for presentation.

14. The method of claim 5, further comprising:
determining a shipping address for the first user account;
determining that the second user account has the shipping address; and
determining that the first user account is associated with the second user account.

15. The method of claim 5, further comprising:
determining that the first product identifier is associated with a purchase event using the user interaction history;
determining that the user interaction history comprises a user interaction event with the first product identifier after the purchase event; and
determining that the user interaction event occurred within a predetermined grace period after the purchase event.

16. The method of claim 5, further comprising:
determining that the user interaction history comprises a content dislike event associated with the second content; and
blocking selection of the second content for presentation.

17. The method of claim 5, further comprising:
determining a browse node indicative of a product hierarchy of the first product identifier, wherein the browse node comprises a set of product identifiers related to the first product identifier;
wherein the first product identifier is a child product identifier to the first parent product identifier at the browse node.

18. The method of claim 5, further comprising storing the database at the at least one memory, wherein the at least one memory comprises a local memory device.

19. A device comprising:
at least one memory that stores computer-executable instructions; and
at least one processor configured to access the at least one memory and execute the computer-executable instructions to:
determine a user interaction history for a first user account, the user interaction history comprising a first product identifier;
determine a second user account associated with the first user account;
determine a first parent product identifier of the first product identifier, wherein the first parent product identifier is a superset product category that encompasses a first product category of the first product identifier;
generate a database comprising the first parent product identifier and a user account identifier for the first user account in a probabilistic array;
automatically modifying values in the probabilistic array to map values of characters in certain positions to represent updated user interactions;
determine a set of candidate content for the first user account, the set of candidate content comprising first content and second content;
determine a second product identifier associated with the first content;
determine a second parent product identifier of the second product identifier, wherein the second parent product identifier is a superset product category that encompasses a second product category of the second product identifier;

determine that the second parent product identifier is not present in the database using a bloom filter;

determine that the second user account has not purchased a product associated with the first content within a predetermined period of time;

determine that the first content is eligible for presentation to the first user account;

select a version of the first content for presentation to the first user account based at least in part on the user interaction history;

determine a time for the audible presentation of the first content by a device associated with the second user account, wherein the time corresponds to a break in streaming audio content;

transmit the version of the first content to the device associated with the first user account for presentation;

and cause the first content to be presented at the time by the device associated with the second user account.

20. The device of claim 19, wherein the at least one processor is further configured to access the at least one memory and execute the computer-executable instructions to:

determine a third product identifier associated with the second content;

determine a third parent product identifier of the third product identifier, wherein the third parent product identifier is a superset product category that encompasses a third product category of the third product identifier; and determine that the third parent product identifier has a likelihood greater than 0 of being in the database using the bloom filter.

\* \* \* \* \*